United States Patent
Bertollini et al.

(10) Patent No.: US 11,046,320 B2
(45) Date of Patent: Jun. 29, 2021

(54) SYSTEM AND METHOD FOR INITIATING AND EXECUTING AN AUTOMATED LANE CHANGE MANEUVER

(71) Applicant: GM Global Technology Operations LLC, Detroit, MI (US)

(72) Inventors: Gary P. Bertollini, Lake Orion, MI (US); Joseph F. Szczerba, Grand Blanc, MI (US); Roy J. Mathieu, Rochester Hills, MI (US); Alicia Napoleon, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 380 days.

(21) Appl. No.: 16/218,963

(22) Filed: Dec. 13, 2018

(65) Prior Publication Data
US 2020/0189595 A1   Jun. 18, 2020

(51) Int. Cl.
| | |
|---|---|
| *B60W 30/18* | (2012.01) |
| *G08G 1/16* | (2006.01) |
| *B60W 50/14* | (2020.01) |
| *G06F 3/01* | (2006.01) |
| *G06K 9/00* | (2006.01) |

(52) U.S. Cl.
CPC ...... *B60W 30/18163* (2013.01); *B60W 50/14* (2013.01); *G06F 3/013* (2013.01); *G06F 3/017* (2013.01); *G06K 9/00845* (2013.01); *G08G 1/167* (2013.01); *B60W 2050/146* (2013.01)

(58) Field of Classification Search
CPC .......... B60W 30/18163; B60W 50/14; B60W 2050/146; G08G 1/167; G06F 3/013; G06F 3/017; G06K 9/00845
See application file for complete search history.

(56) References Cited

U.S. PATENT DOCUMENTS

| | | | | |
|---|---|---|---|---|
| 9,475,389 | B1 * | 10/2016 | Fung | B60K 35/00 |
| 10,192,110 | B2 * | 1/2019 | Chen | G06K 9/2027 |
| 2010/0218641 | A1 * | 9/2010 | Neumann | B62D 1/046 |
| | | | | 74/552 |
| 2013/0076499 | A1 * | 3/2013 | Okita | B60K 35/00 |
| | | | | 340/438 |
| 2014/0148988 | A1 * | 5/2014 | Lathrop | B60W 50/14 |
| | | | | 701/23 |
| 2018/0354517 | A1 * | 12/2018 | Banno | B60W 50/14 |
| 2019/0156134 | A1 * | 5/2019 | Krishnan | A61B 5/225 |
| 2020/0184238 | A1 * | 6/2020 | Kobayashi | G06T 7/70 |
| 2020/0273429 | A1 * | 8/2020 | Broy | B62D 1/06 |

* cited by examiner

*Primary Examiner* — Ramsey Refai
(74) *Attorney, Agent, or Firm* — Cantor Colburn LLP

(57) ABSTRACT

A system for initiating and executing an automated lane change maneuver in a vehicle may include a steering wheel interface having a display; and a monitor to detect a viewing direction of the user. The interface may detect a first predetermined gesture by the user; in response to the first predetermined gesture, transmit a first signal to the vehicle instructing the vehicle to prepare for the automated lane change maneuver; display a status of the automated lane change maneuver; display a prompt for the user to visually confirm safety of the automated lane change maneuver. The monitor may continuously detect the viewing direction of the user; and in response to the viewing direction of the user changing, transmit a second signal to the vehicle instructing the vehicle to execute the automated lane change maneuver.

20 Claims, 16 Drawing Sheets

SYSTEM AND METHOD FOR INITIATING AND EXECUTING AN AUTOMATED LANE CHANGE MANEUVER

INTRODUCTION

The subject disclosure relates to a system and method for initiating and executing an automated lane change maneuver in a vehicle.

Developments in automated vehicle capabilities may allow the opportunity to provide on demand lane change assistance and automated lane change maneuvers. However, with conventional turn signal devices and methods, there is a dissociation between the operator input and the desired motion of the vehicle. For example, a typical turn signal control may be a lever protruding laterally from the steering wheel stalk. While the motion of the turn signal control may be in an up or down direction, the required operator interaction to steer the vehicle is turning the steering wheel to the left or right, and the desired motion for the lane change is in a left or right direction. In other words, the motion of the turn signal control in an up or down direction is dissociated from the operator's expected interaction and movement of the lane change in a left or right direction. Additionally, conventional turn signal indicators do not provide the proper context or state information to the operator to give a clear understanding of the status or execution of a vehicle lane change maneuver after a lane change request. Furthermore, the conventional turn signal control and turn signal indicators results in additional clutter in the driver control area and driver information area or speedometer cluster area.

Accordingly, it may be desirable to provide a system and method for initiating and executing an automated lane change maneuver in a vehicle that results in greater congruity between the operator input, traditional steering motions, and the expected motion of the vehicle. In addition, it may be desirable to provide a system and method that provides additional context or state information to the operator to give a clear understanding of the status or execution of the vehicle lane change maneuver after a lane change request, and eliminate unnecessary clutter in the driver control area driver information area or speedometer cluster area.

SUMMARY

In one exemplary embodiment, a system for initiating and executing an automated lane change maneuver in a vehicle operated by a user and having a steering wheel may include an interface comprising a display, the interface being provided in the steering wheel; and a monitor structured to detect a viewing direction of the user. The interface and the monitor may be operably connected. The interface may be structured to detect a first predetermined gesture by the user; in response to the first predetermined gesture by the user, transmit a first signal to the vehicle instructing the vehicle to prepare for the automated lane change maneuver; display, on the display, a status of the automated lane change maneuver; and display, on the display, a prompt for the user to visually confirm safety of the automated lane change maneuver. The monitor may be structured to, in response to the prompt for the user to visually confirm safety of the automated lane change maneuver, continuously detect the viewing direction of the user. The monitor may be further structured to, in response to the viewing direction of the user changing to visually confirm safety of the automated lane change maneuver, transmit a second signal to the vehicle instructing the vehicle to execute the automated lane change maneuver.

In another exemplary embodiment of the system, the interface may include a touchless motion detector structured to detect the first predetermined gesture by the user.

In another exemplary embodiment of the system, the interface may include a touch screen detector and the first predetermined gesture may include a predetermined movement of a finger or hand of the user on the touch screen detector.

In another exemplary embodiment of the system, the display may be configured to display a first indicator indicating acknowledgment of the first predetermined gesture.

In another exemplary embodiment of the system, the display may be configured to display, after a first predetermined time period, a second indicator to indicate a passage of the first predetermined time period.

In another exemplary embodiment of the system, the display may be configured to display, after a second predetermined time period, a third indicator to indicate a time out and cancellation of the automated lane change maneuver.

In another exemplary embodiment of the system, the first indicator may have a first color, the second indicator may have a second color, and the third indicator may have a third color. The first color, the second color, and the third color may be different from each other.

In another exemplary embodiment of the system, the first indicator may blink at a first frequency, the second indicator may blink at a second frequency, and the third indicator may blink at a third frequency.

In another exemplary embodiment of the system, the second frequency may be higher than the first frequency, and the third frequency may be higher than the second frequency.

In another exemplary embodiment of the system, the prompt may include a dynamic graphic.

In another exemplary embodiment of the system, the dynamic graphic may include an indicator that moves in a direction of the automated lane change maneuver.

In another exemplary embodiment of the system, the interface may be structured to, in response to a second predetermined gesture by the user, transmit a third signal to the vehicle instructing the vehicle to cancel the automated lane change maneuver.

In one exemplary embodiment, a method for initiating and executing an automated lane change maneuver in a vehicle operated by a user and having a steering wheel may include providing an interface comprising a display in the steering wheel and a monitor structured to detect a viewing direction of the user. The method may further include detecting, with the interface, a first predetermined gesture by the user; in response to the detection of the first predetermined gesture. The method may further include transmitting a first signal to the vehicle instructing the vehicle to prepare for the automated lane change maneuver. The method may further include displaying, on the display, a status of the automated lane change maneuver. The method may further include displaying, on the display, a prompt for the user to visually confirm safety of the automated lane change maneuver. The method may further include, in response to the prompt for the user to visually confirm safety of the automated lane change maneuver, continuously detecting, with the monitor, the viewing direction of the user. The method may further include, in response to the viewing direction of the user changing to visually confirm safety of the automated lane change maneuver, transmitting a second signal to the vehicle instructing the vehicle to execute the automated lane change maneuver.

In another exemplary embodiment of the method, the displaying a status of the automated lane change maneuver may include displaying a first indicator indicating acknowledgement of the first predetermined gesture.

In another exemplary embodiment of the method, the displaying a status of the automated lane change maneuver may include displaying, after a first predetermined time period, a second indicator to indicate a passage of the first predetermined time period.

In another exemplary embodiment of the method, the displaying a status of the automated lane change maneuver further may include displaying, after a second predetermined time period, a third indicator to indicate a time out and cancellation of the automated lane change maneuver.

In another exemplary embodiment of the method, the first indicator may have a first color, the second indicator may have a second color, and the third indicator may have a third color. The first color, the second color, and the third color may be different from each other. The first indicator may blink at a first frequency, the second indicator may blink at a second frequency, and the third indicator may blink at a third frequency. The second frequency may be higher than the first frequency, and the third frequency may be higher than the second frequency.

In another exemplary embodiment of the method, the displaying a prompt may include displaying a dynamic graphic.

In another exemplary embodiment of the method, the method may include in response to a second predetermined gesture by the user, transmitting a third signal to the vehicle instructing the vehicle to cancel the automated lane change maneuver.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
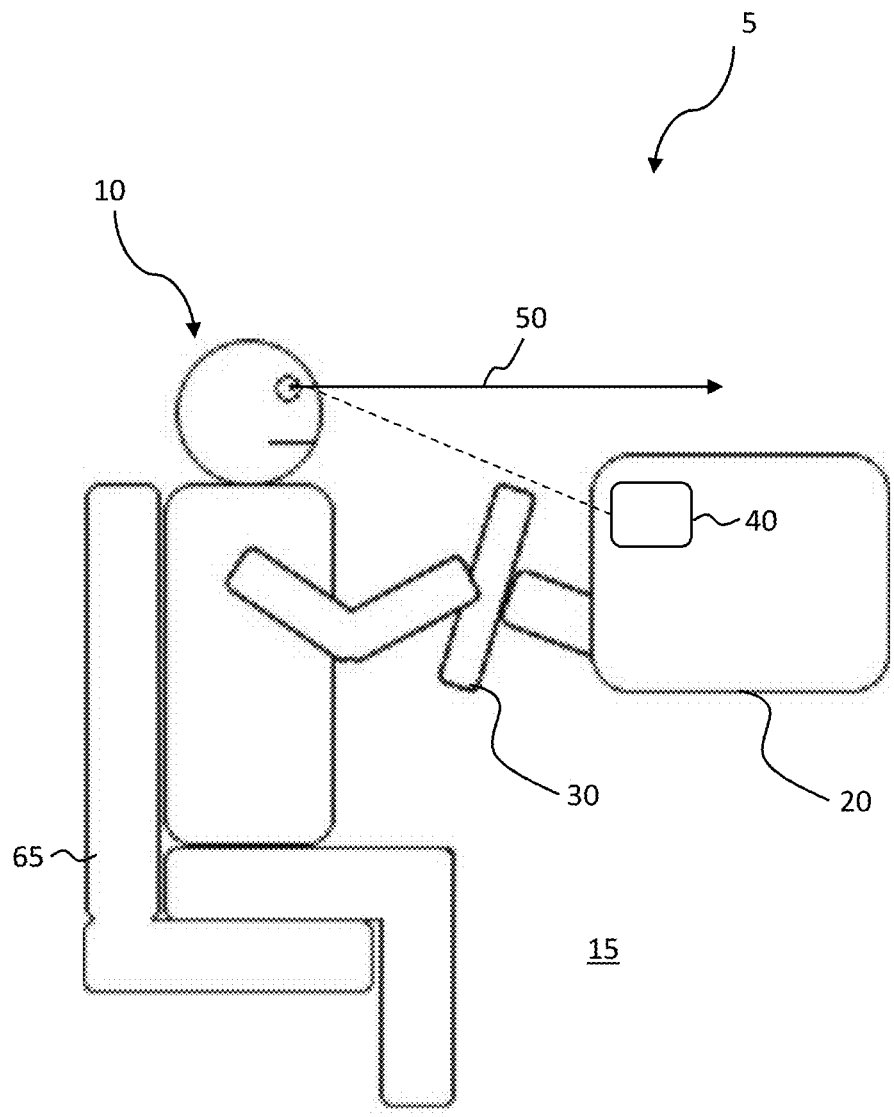
FIG. 1 is a schematic diagram of an exemplary embodiment of a system for initiating and executing an automated lane change maneuver.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
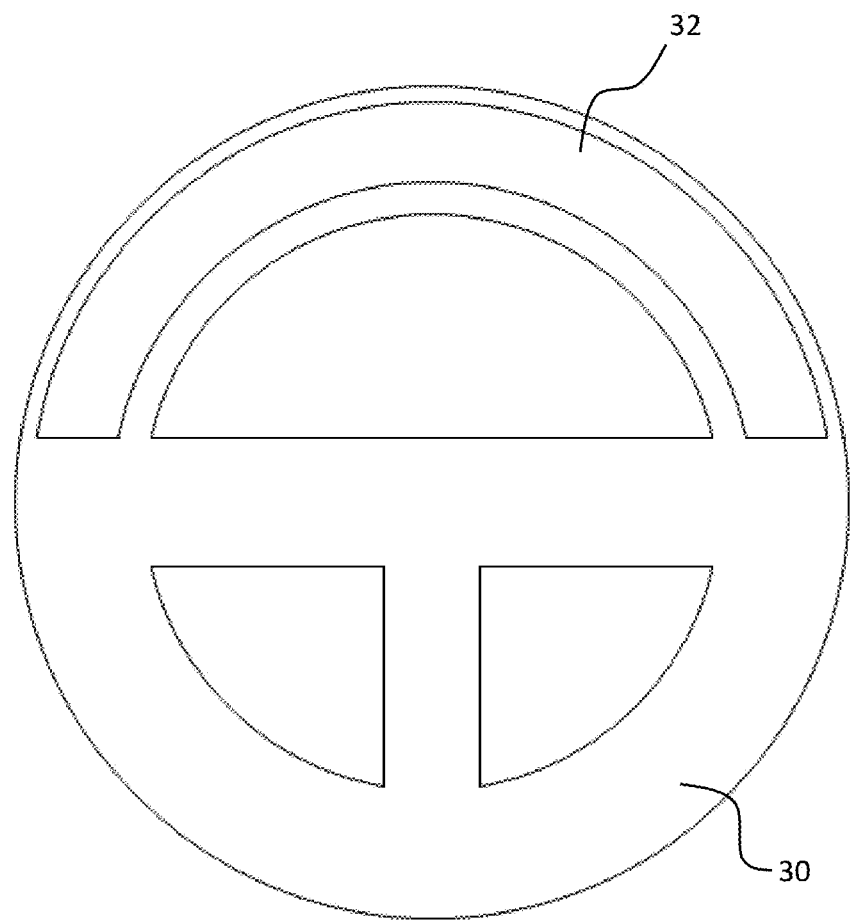
FIG. 2 is a schematic diagram of an exemplary embodiment of a system for initiating and executing an automated lane change maneuver.

In accordance with an exemplary embodiment, FIGS. 1 and 2 show a system for initiating and executing an automated lane change maneuver in a vehicle 5. FIG. 1 is a schematic diagram showing an interior 15 of the vehicle 5 in which a user 10 is operating the vehicle. The vehicle may include a dashboard 20 and a steering wheel 30. Additionally, the vehicle may include a driver monitoring system 40 structured to detect a viewing direction 50 of the user 10. Driver monitoring system 40 may include an image sensor such as a charge-coupled device (CCD) or infrared CCD configured to detect the eyes of user 10 and the direction in which the eyes are facing.

FIG. 2 shows the steering wheel 30 in more detail. Steering wheel 30 may include an interface 32 provided within steering wheel 30. Interface 32 may be operably coupled to driver monitoring system 40, and may be structured to both detect input from user 10 and display information to user 10 on a display integrated into interface 32. For example, interface 32 may include capacitive sensors, infrared (IR) sensors, or resistive sensors configured to detect a motion of the user's hand, or detect contact of the user's hand. In other words, the interface 32 may be a touchless motion detector, or may be a touch-screen or similar device. The display of interface 32 may include an LCD display, an LED display, LED lights, or other suitable visual displays.

Figure 3:
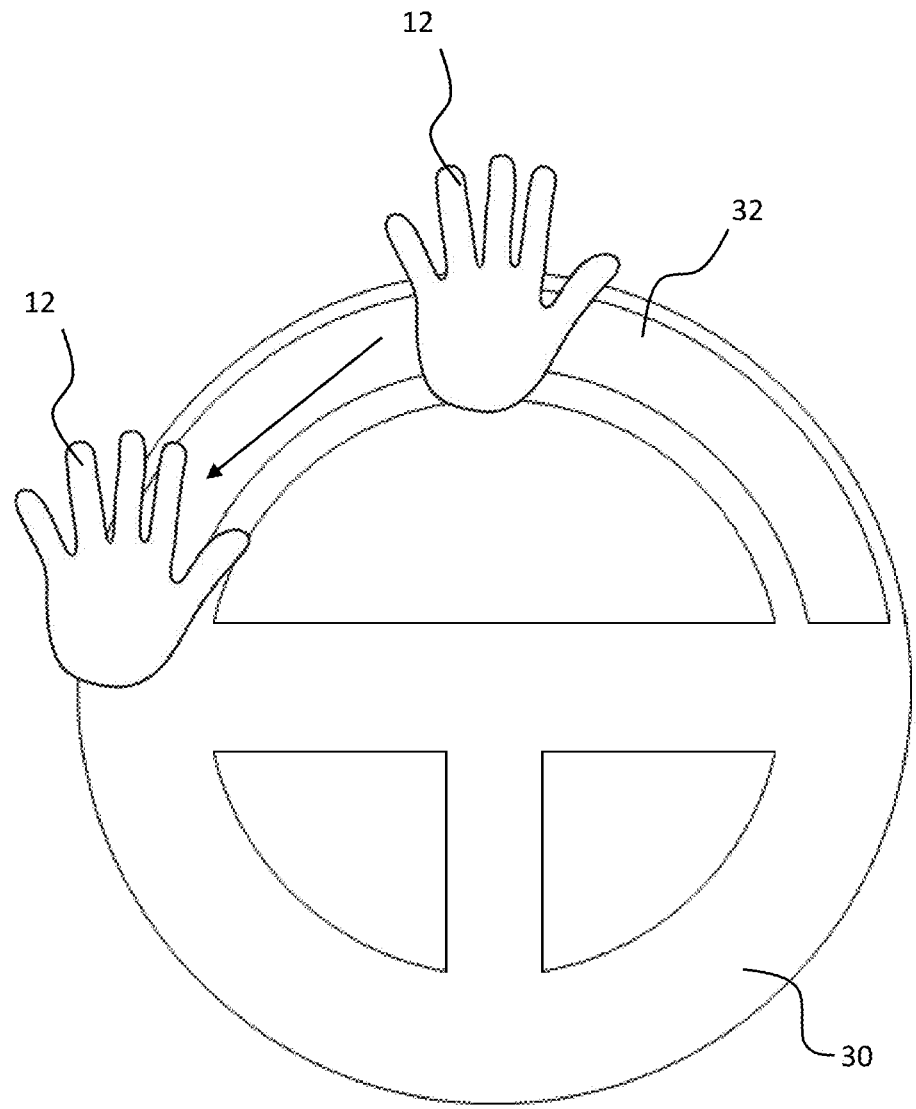
FIG. 3 is a schematic diagram of an exemplary embodiment of a predetermined first gesture.
Figure 4:
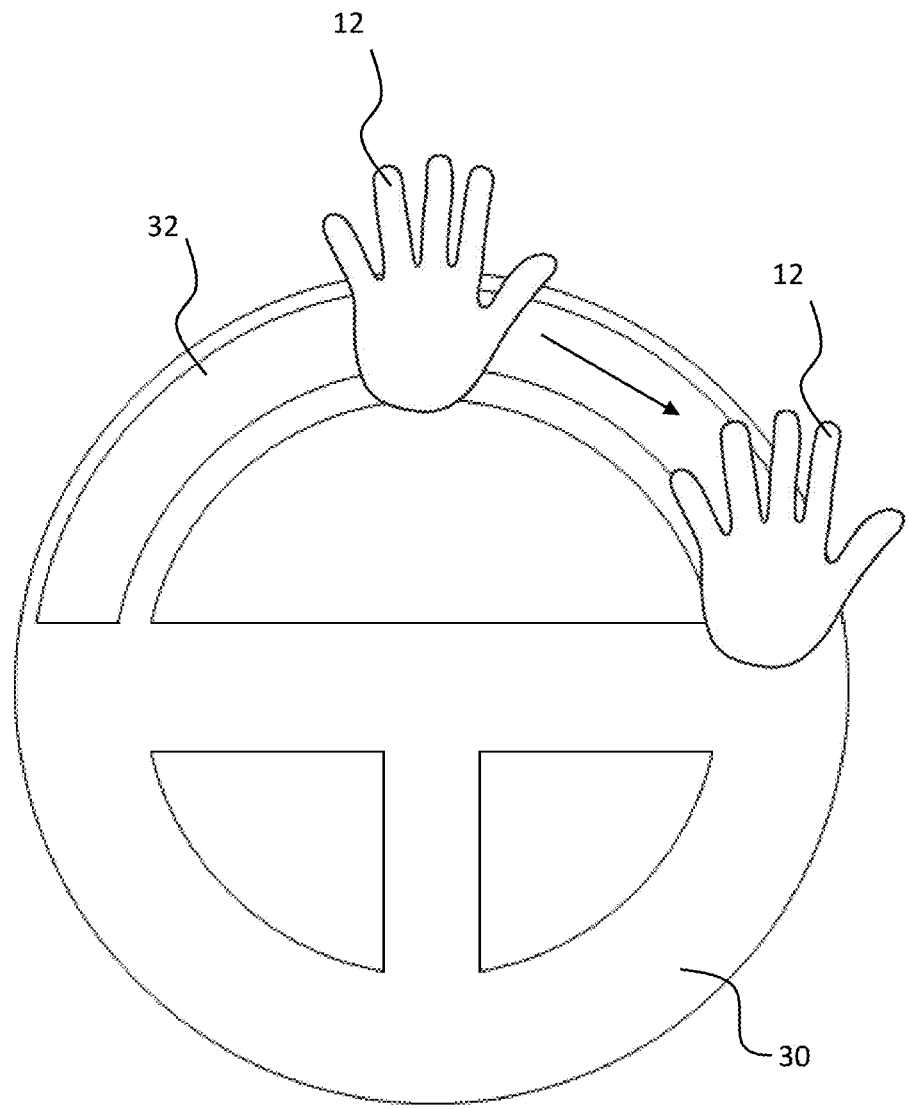
FIG. 4 is a schematic diagram of an exemplary embodiment of a predetermined first gesture.

To initiate an automated lane change maneuver, the user performs a first predetermined gesture. FIGS. 3 and 4 illustrate possible embodiments of the first predetermined gesture, and assume that the interface 32 is a touchless motion detector type interface. As shown in FIG. 3, if the user wishes to change lanes to the left, the first predetermined gesture may be a movement of hand 12 from a twelve o'clock position of steering wheel 30 in a counter-clockwise direction toward the nine o'clock position of steering wheel 30. As shown in FIG. 4, if the user wish to change lanes to the right, the first predetermined gesture may be a movement of hand 12 from a twelve o'clock position of steering wheel 30 in a clockwise direction toward the three o'clock position of steering wheel 30. Alternatively, if interface 32 is a touch screen type interface, then the first predetermined gesture may be a swipe of a finger in a particular direction, tapping a particular region of interface 32, or a combination of swiping and tapping. It will be understood that the gestures discussed above are provided as illustrative examples, and other types of gestures may also be used to initiate a lane change maneuver.

The predetermined first gestures described above include a motion to the left or a motion to the right. This results in greater congruity between the user interaction and the desired motion of the vehicle 5. Additionally, the predetermined first gesture more closely mimics the traditional steering motion than would an activation with a conventional turn signal control, thereby giving the user increased comfort and confidence in the automated lane change maneuver. Additionally, the interface and the use of the predetermined first gesture eliminates the need for a separate physical turn signal control on the stalk of the steering wheel 30.

Figure 5:
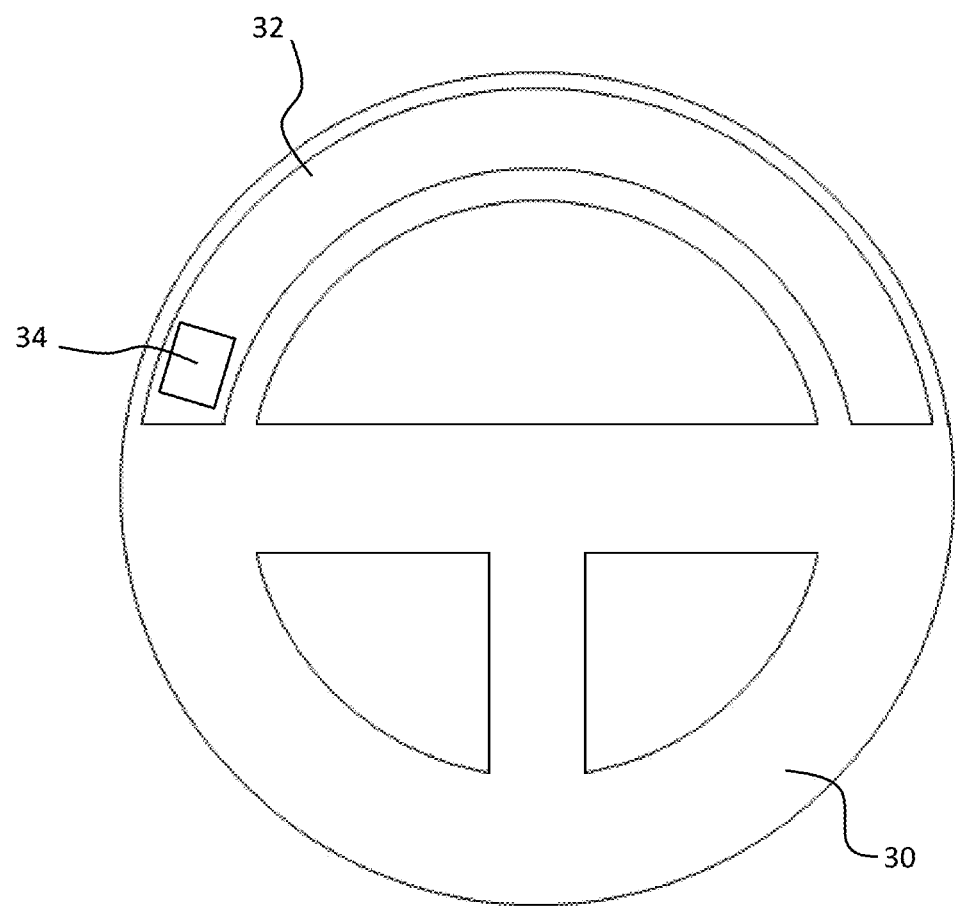
FIG. 5 is a schematic diagram of an exemplary embodiment of a first indicator.

Interface 32 is further structured to display a status of the automated lane change maneuver. For example, once the first predetermined gesture is detected, interface 32 may display a first indicator acknowledging detection of the first predetermined gesture. The first indicator may take the form of a light being displayed on the side of interface 32 to which the automated lane change maneuver is desired. For example, as seen in FIG. 5, an indicator 34 may activate on a left side of interface 32 if a left side automated lane change maneuver is requested. Indicator 34 may be a lit or colored portion of interface 32, using a first color, or alternatively, indicator 34 may be an illuminated LED. Additionally, indicator 34 may be steadily illuminated, or it may flash at a first predetermined frequency.

Figure 6:
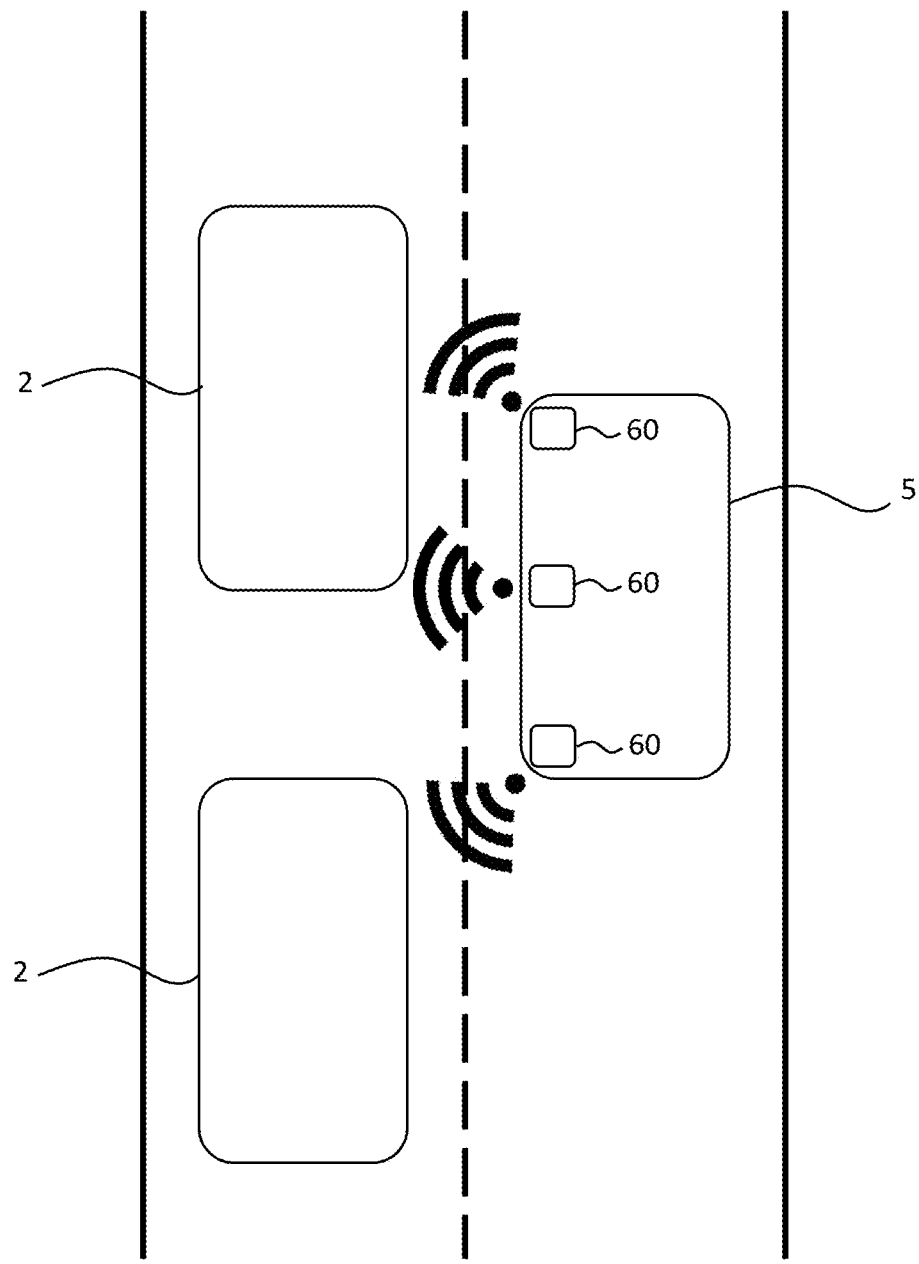
FIG. 6 is a schematic diagram of an exemplary embodiment of a system for initiating and executing an automated lane change maneuver.

Once the first predetermined gesture is received, interface 32 sends a first signal to the vehicle to prepare for the automated lane change maneuver. As seen in FIG. 6, vehicle 5 prepares for the automated lane change maneuver by using detectors 60 to detect whether the adjacent lane 150 has available space to make a safe lane change, or whether other vehicles 2 prevent a lane change at that time. Detectors 60 may include Radio Detection And Ranging (RADAR) or Light Detection and Ranging (LIDAR) detectors.

Figure 7:
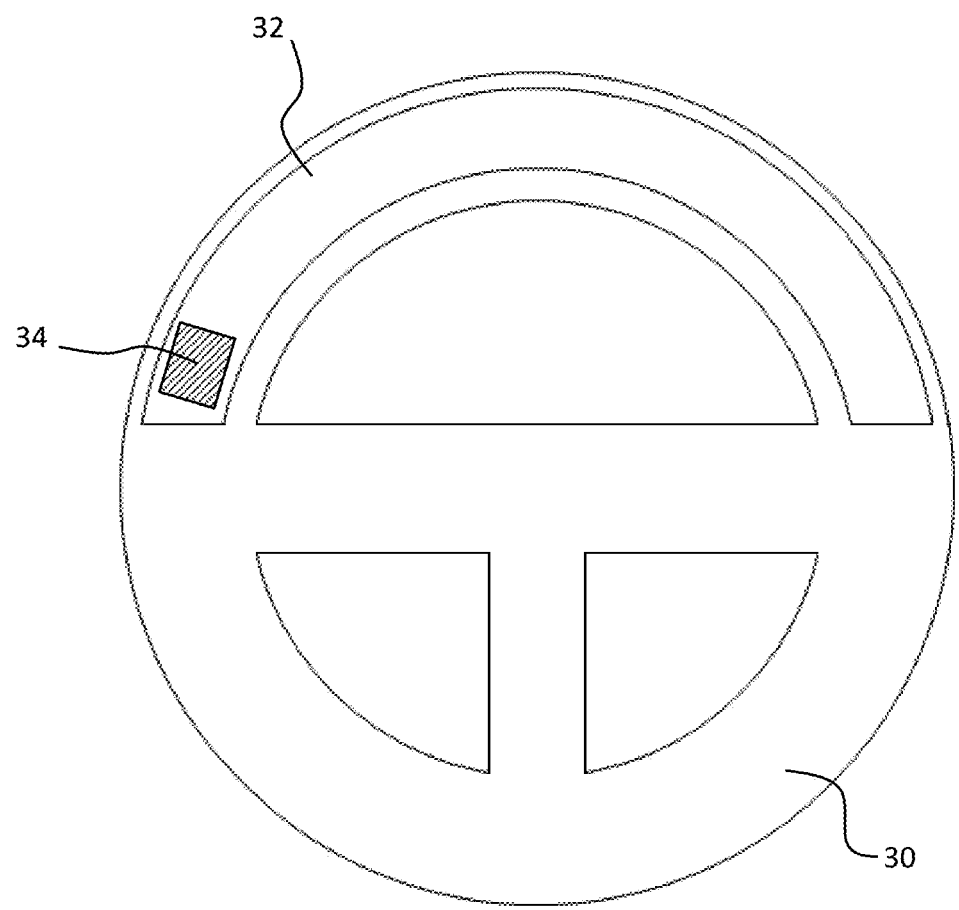
FIG. 7 is a schematic diagram of an exemplary embodiment of a second indicator.

If detectors 60 determine that there is no space available and a lane change cannot be performed, then the detectors standby and continue to monitor the adjacent lane. FIG. 7 shows that after a first predetermined time period with no detected lane opening, indicator 34 may change its status. For example, indicator 34 may change color after the first predetermined time has passed (indicated by the light hatching in FIG. 7), or indicator 34 may flash at a second predetermined frequency higher than the first predetermined frequency. The second color or second predetermined frequency of indicator 34 may inform user 10 that the vehicle is still waiting for an opening in the adjacent lane. As one example, the first predetermined time period may be 15 seconds from the time the user gesture is detected, though it will be understood that this time period could be varied depending on the specific application.

Figure 8:
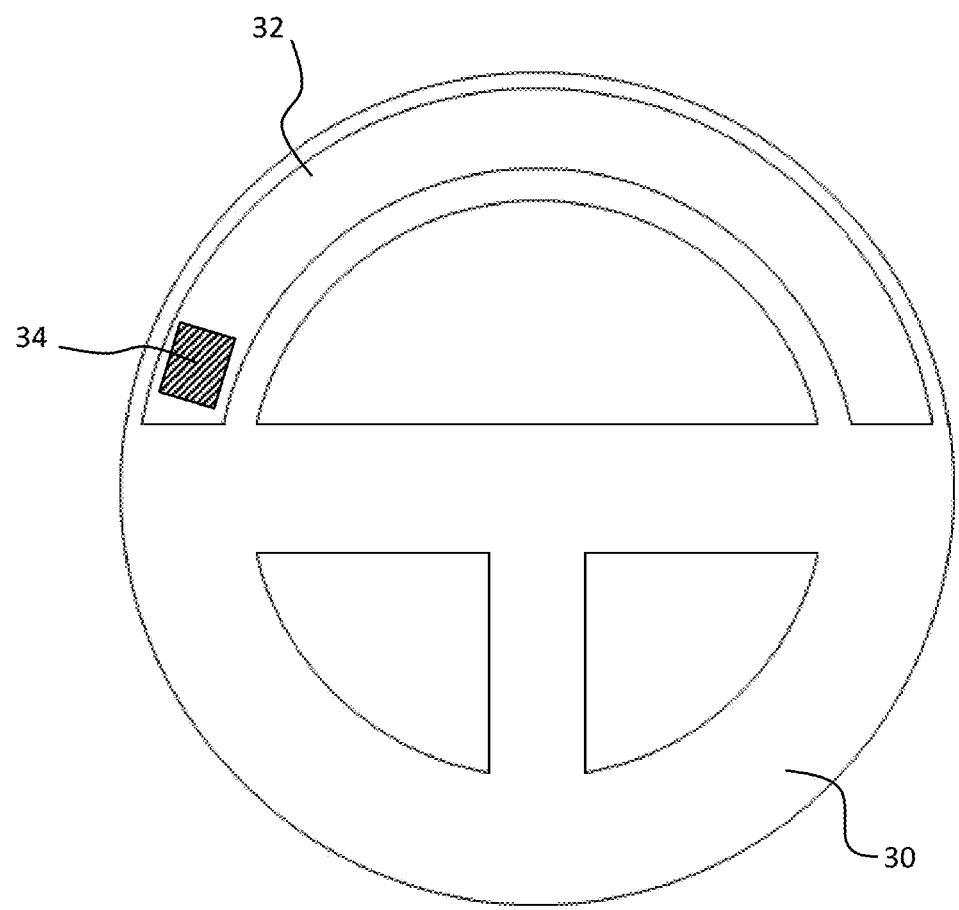
FIG. 8 is a schematic diagram of an exemplary embodiment of a third indicator.

FIG. 8 shows that after a second predetermined time period with no detected lane opening, indicator 34 may change its status again. For example, indicator 34 may change to a third color (indicated by the heavy hatching in FIG. 8), or indicator 34 may flash at a third predetermined frequency higher than the second predetermined frequency. The third color or third predetermined frequency may inform user 10 that too much time has elapsed without detecting a lane opening, and that the automated lane change maneuver is being cancelled. As one example, the second predetermined time period may be 30 seconds from the time the user gesture is detected, though it will be understood that this time period may be varied depending on the specific application.

The above describes that the indicator 34 has having three different states, i.e., first color or first predetermined frequency, second color or second predetermined frequency, or third color or third predetermined frequency. However, it will also be understood that each of the states of indicator 34 may be described as a first indicator, second indicator, and third indicator for convenience. Additionally, it will be understood that the description of first indicator, second indicator, and third indicator does not require three separate physical indicators. For example, the first indicator, second indicator, and third indicator may simply refer to a different graphic being shown on the display of interface 32.

Figure 9:
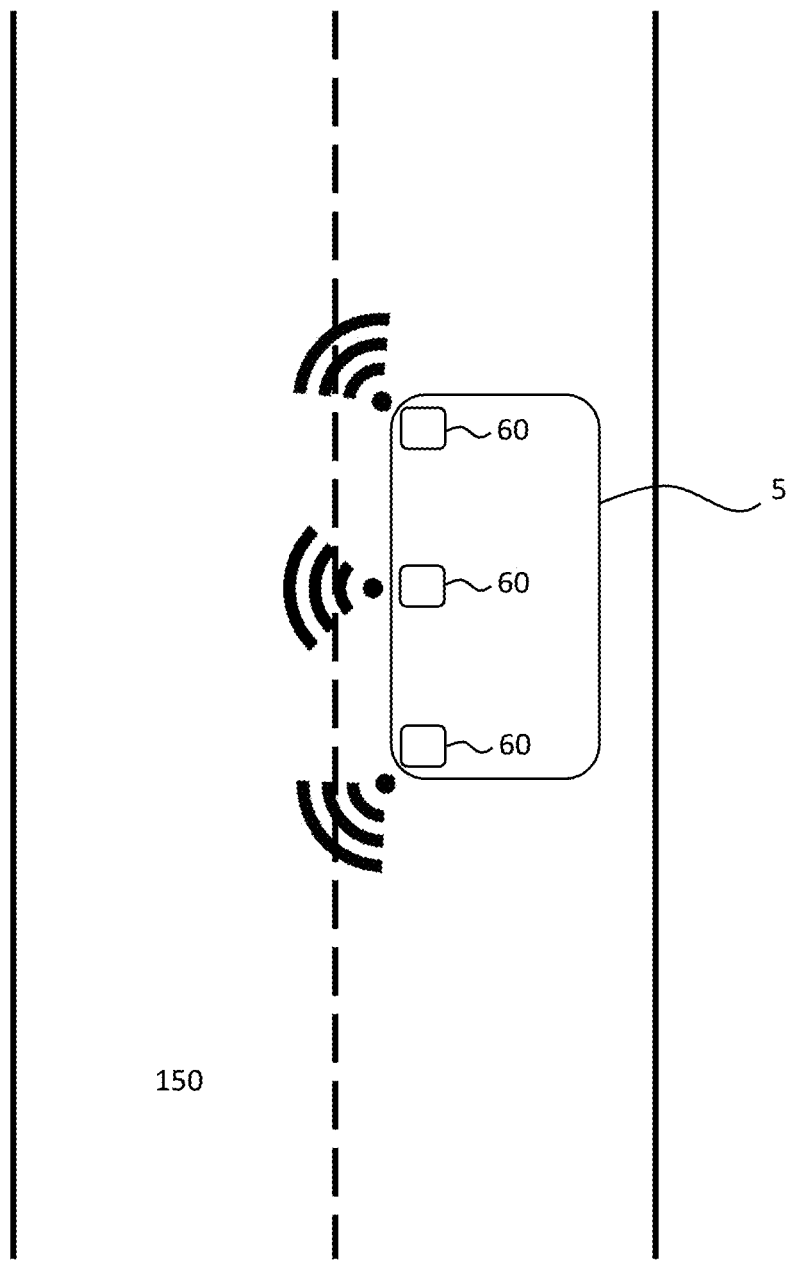
FIG. 9 is a schematic diagram of an exemplary embodiment of a system for initiating and executing an automated lane change maneuver.
Figure 10:
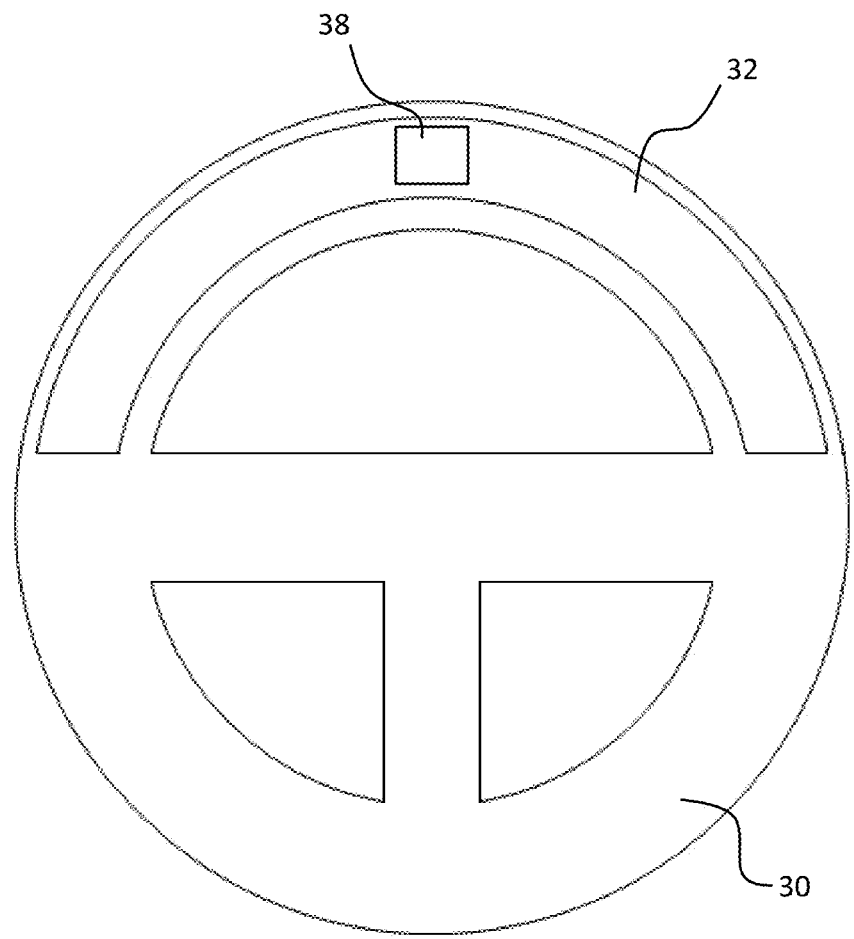
FIG. 10 is a schematic diagram of an exemplary embodiment of a prompt.
Figure 11:
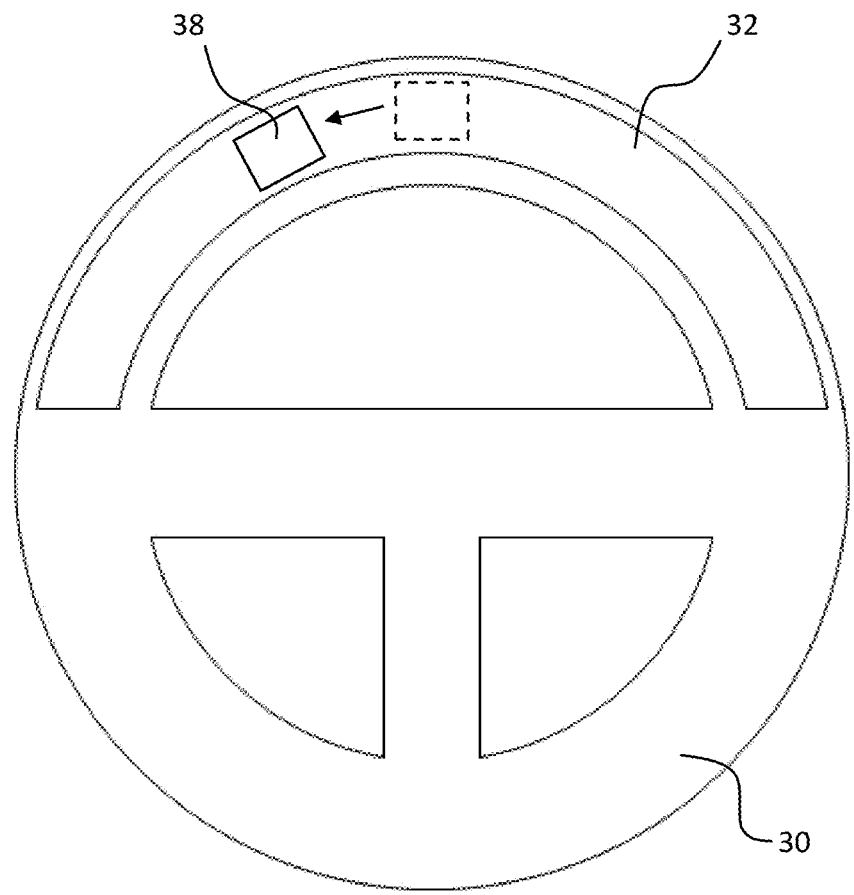
FIG. 11 is a schematic diagram of an exemplary embodiment of a prompt.
Figure 12:
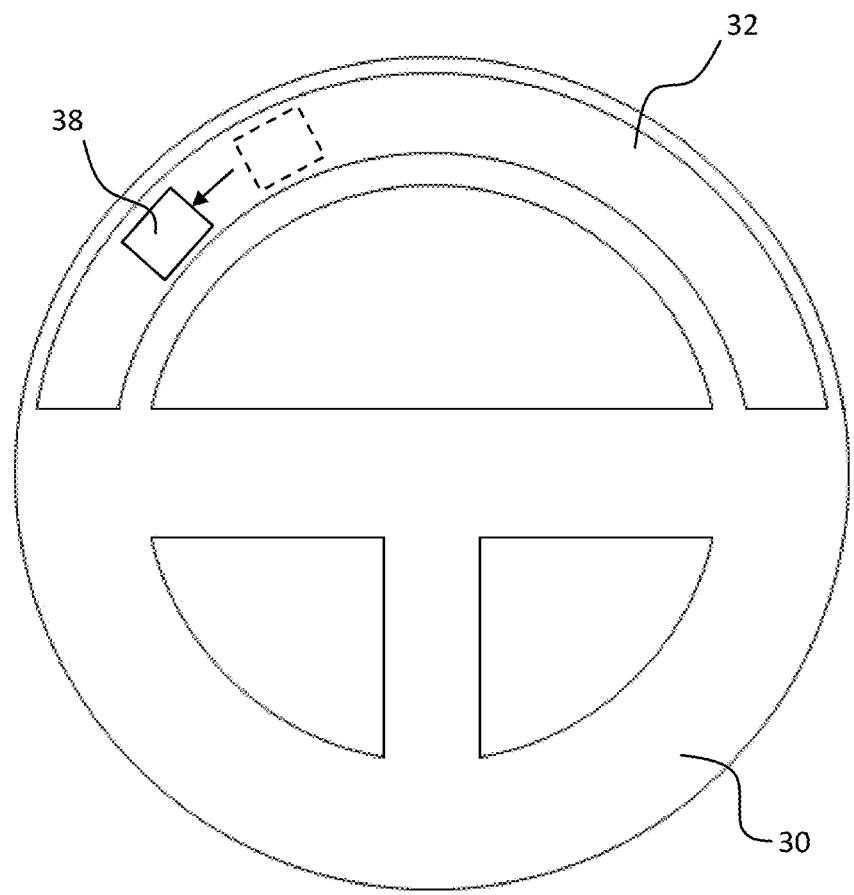
FIG. 12 is a schematic diagram of an exemplary embodiment of a prompt.
Figure 13:
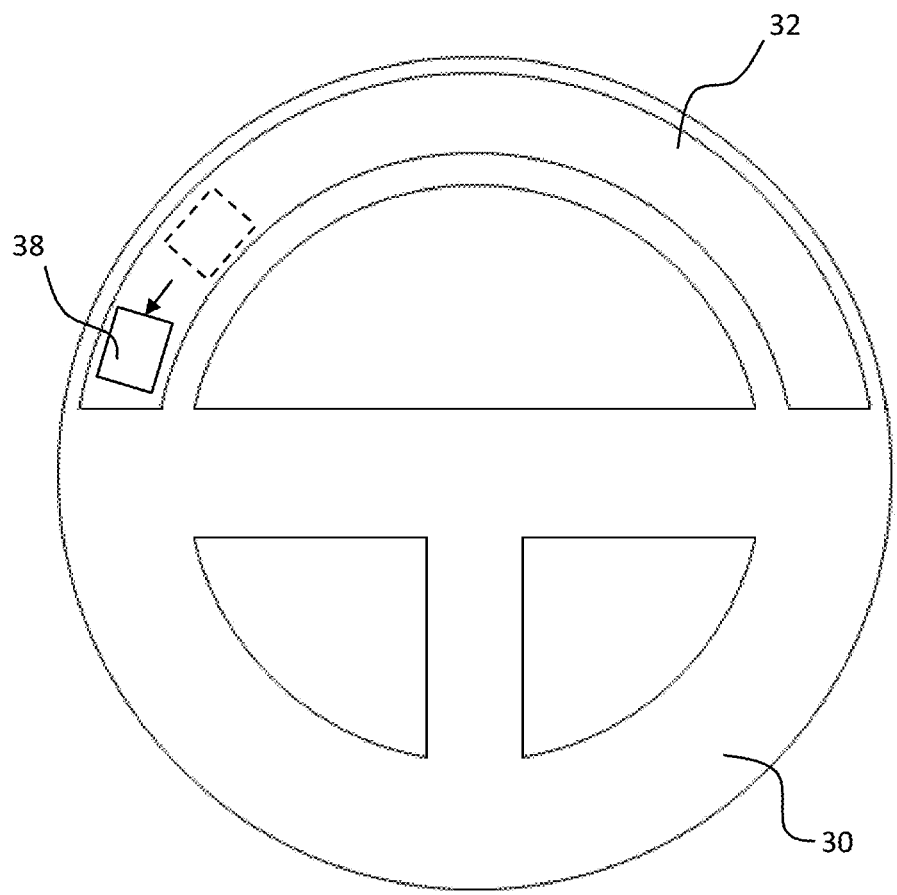
FIG. 13 is a schematic diagram of an exemplary embodiment of a prompt.

If detectors 60 are able to identify a lane opening before the second predetermined time period expires, as shown in FIG. 9, then interface 32 displays a prompt to user 10 to visually confirm safety of the automated lane change maneuver. In at least an embodiment, the prompt may be a dynamic graphic that includes visual movement to attract the attention of user 10. FIGS. 10, 11, 12, and 13 show an exemplary embodiment of a prompt indicator 38. For example, prompt indicator 38 may be an illuminated shape that moves from the twelve o'clock position in a direction toward the side of the requested lane change. In FIGS. 10, 11, 12, and 13, the dashed lines and arrows illustrate the motion of prompt indicator 38 along interface 32 of steering wheel 30. The motion of prompt indicator 38 may be repeated until the user notices the prompt and visually confirms safety of the automated lane change maneuver. It will be understood that there are many different configurations which may be used as prompt indicator 38. For example, instead of a single shape traveling along interface 32, prompt indicator 38 may be a sequence of two or more colors or shades that are animated to move in the direction of the desired lane change. Alternatively, prompt indicator 38 may be a sequence of LEDs illuminated and turned off in sequence to simulate motion in the direction of the desired lane change. If desired, the visual prompt on interface 32 may also be accompanied by an audio prompt such as a chime or voice recording, or a tactile prompt such as a vibration in the steering wheel 30 or seat 65.

As noted above, the prompt instructs the user to visually confirm safety of the automated lane change maneuver. This may be by the user turning his or her head to look to the side of the intended lane change and check the vehicle's blind spot. In response to the prompt from interface 32, driver monitoring system 40 continuously monitors a viewing direction 50 of user 10. By detecting the eyes of user 10, driver monitoring system 40 is able to detect when the user's viewing direction 50 changes to check the direction of the intended lane change. Once driver monitoring system 40 confirms that user 10 has visually confirmed safety of the automated lane change maneuver, driver monitoring system 40 may send a second signal to the vehicle to execute the lane change maneuver.

Figure 14:
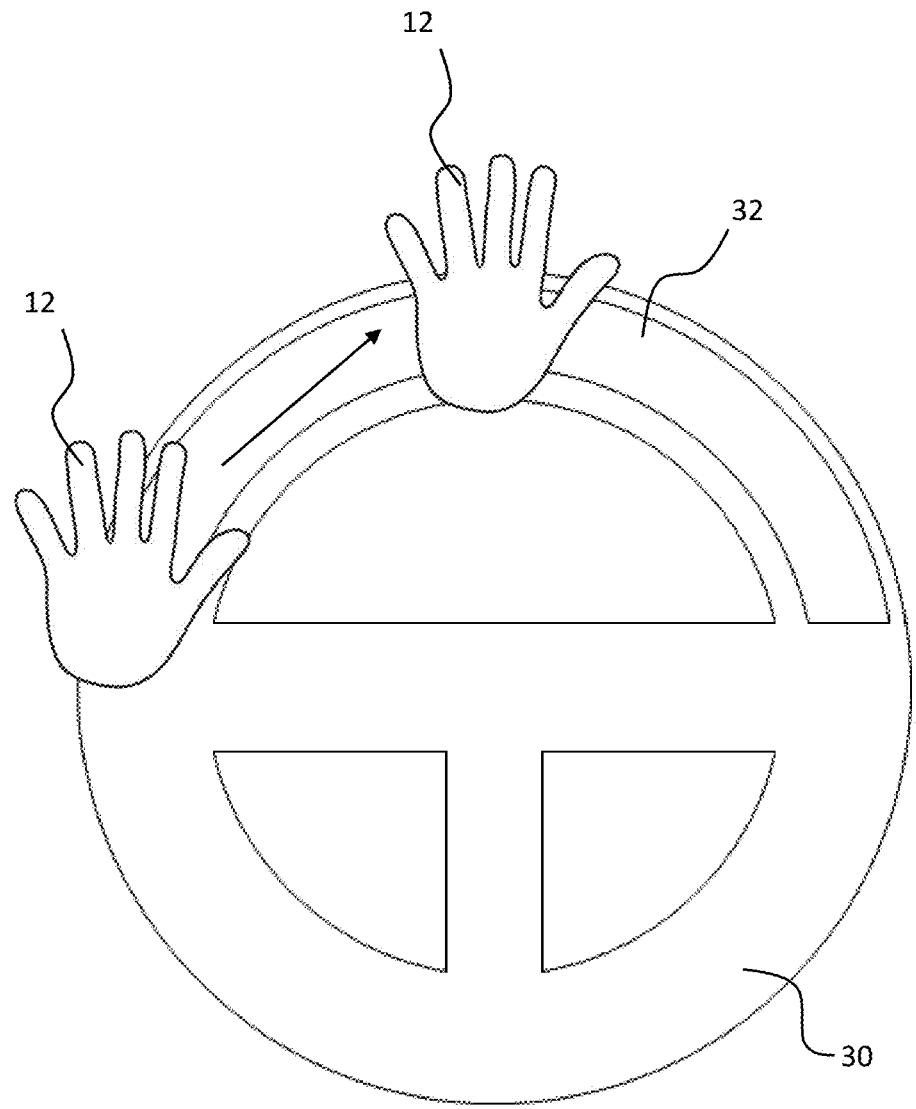
FIG. 14 is a schematic diagram of an exemplary embodiment of a predetermined second gesture.

If user 10 decides to cancel the automated lane change maneuver, or the visual check indicates that the automated lane change maneuver is not safe, the user may take active control of the vehicle by using steering wheel 30 to counter the lane change. Alternatively, the user may cancel the automated lane change maneuver by making a second predetermined gesture to be recognized by interface 32. FIG. 14 illustrates an exemplary embodiment of the second predetermined gesture. As seen in FIG. 14, to cancel an automated lane change maneuver to the left, the user may position his hand 12 near the nine o'clock position and swipe the hand toward the twelve o'clock position. Alternatively, the second predetermined gesture may be a predetermined pattern of taps, such as two taps near the twelve o'clock position of interface 32.

As discussed above, the indicators and prompts provided on the display of interface 32 provide the user 10 with additional context-appropriate information that would not be available using traditional turn signal indicators. For example, the user is provided with detailed information regarding the status of the automated lane change maneuver and prominent visual cues when additional user interaction is required. Additionally, the indicators and prompts are provided in an area on the rim of the steering wheel 30 that is easy for the user to find and interpret, and is relatively close to the user's standard viewing direction during vehicle operation. Therefore, user distraction can be reduced and the user's comfort and confidence with the automated lane change maneuver is increased.

Figure 15:
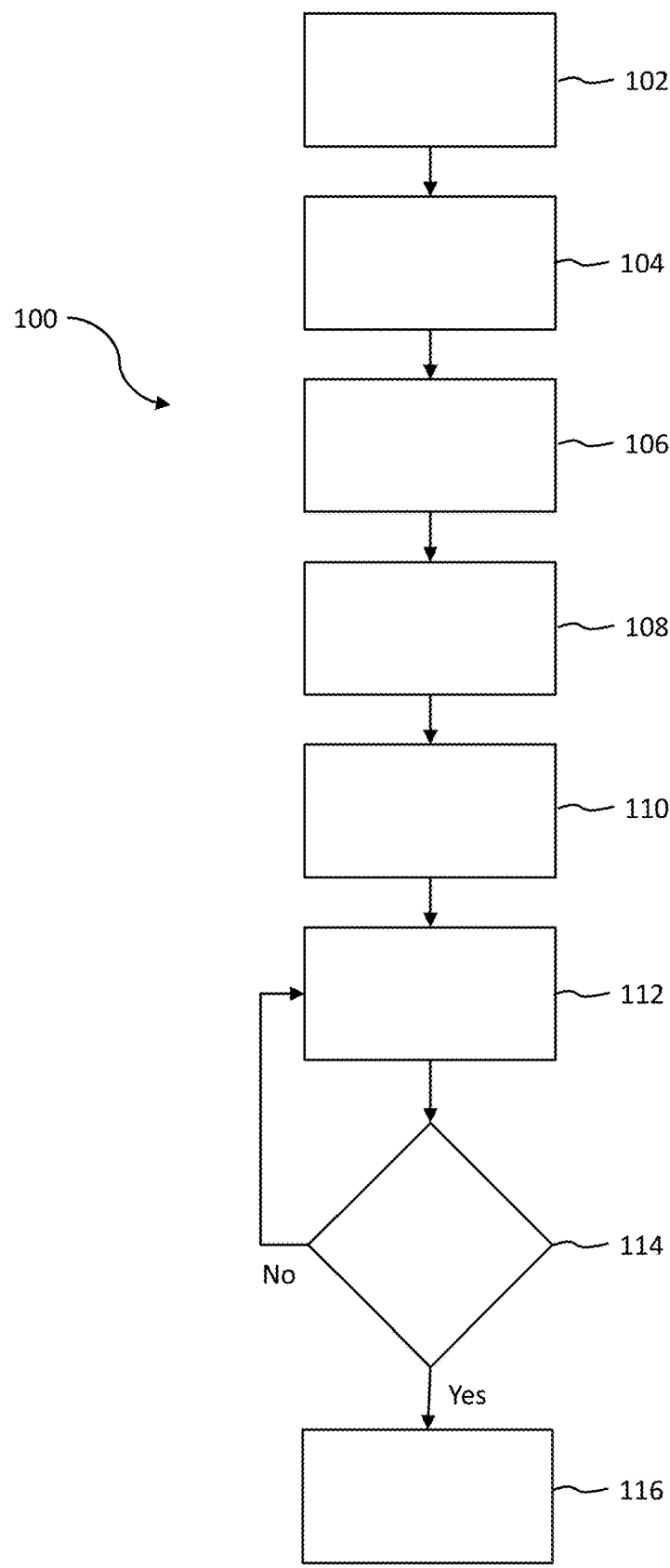
FIG. 15 is a flowchart diagram of an exemplary embodiment of a method for initiating and executing an automated lane change maneuver.

FIG. 15 shows an exemplary embodiment of a method 100 for initiating and executing an automated lane change maneuver in a vehicle 5. In block 102, an interface 32 is provided, the interface comprising a display in the steering wheel 30, and a monitor 40 structured to detect a viewing direction 50 of the user 10. In block 104, a first predetermined gesture of the user is detected with the interface. In block 106, in response to the detection of the first predetermined gesture, a first signal is transmitted to the vehicle instructing the vehicle to prepare for the automated lane change maneuver. In block 108, a status of the automated lane change maneuver is displayed on the display. One possible example of displaying the status of the automated lane change maneuver is discussed below in detail with reference to FIG. 16.

In block 110, a prompt is displayed on the display prompting the user to visually confirm safety of the automated lane change maneuver. The prompt may be a dynamic graphic that includes visual movement to attract the attention of user. In block 112, the monitor 40 continuously detects whether the viewing direction of the user. In block 114, it is determined whether the user's viewing direction has changed. If the user's viewing direction has not changed ("No" in block 114), then the process returns to block 112. If the user's viewing direction has changed ("Yes" in block 114), then the process proceeds to block 116. In block 116, a second signal is transmitted to the vehicle instructing the vehicle to execute the automated lane change maneuver.

Figure 16:
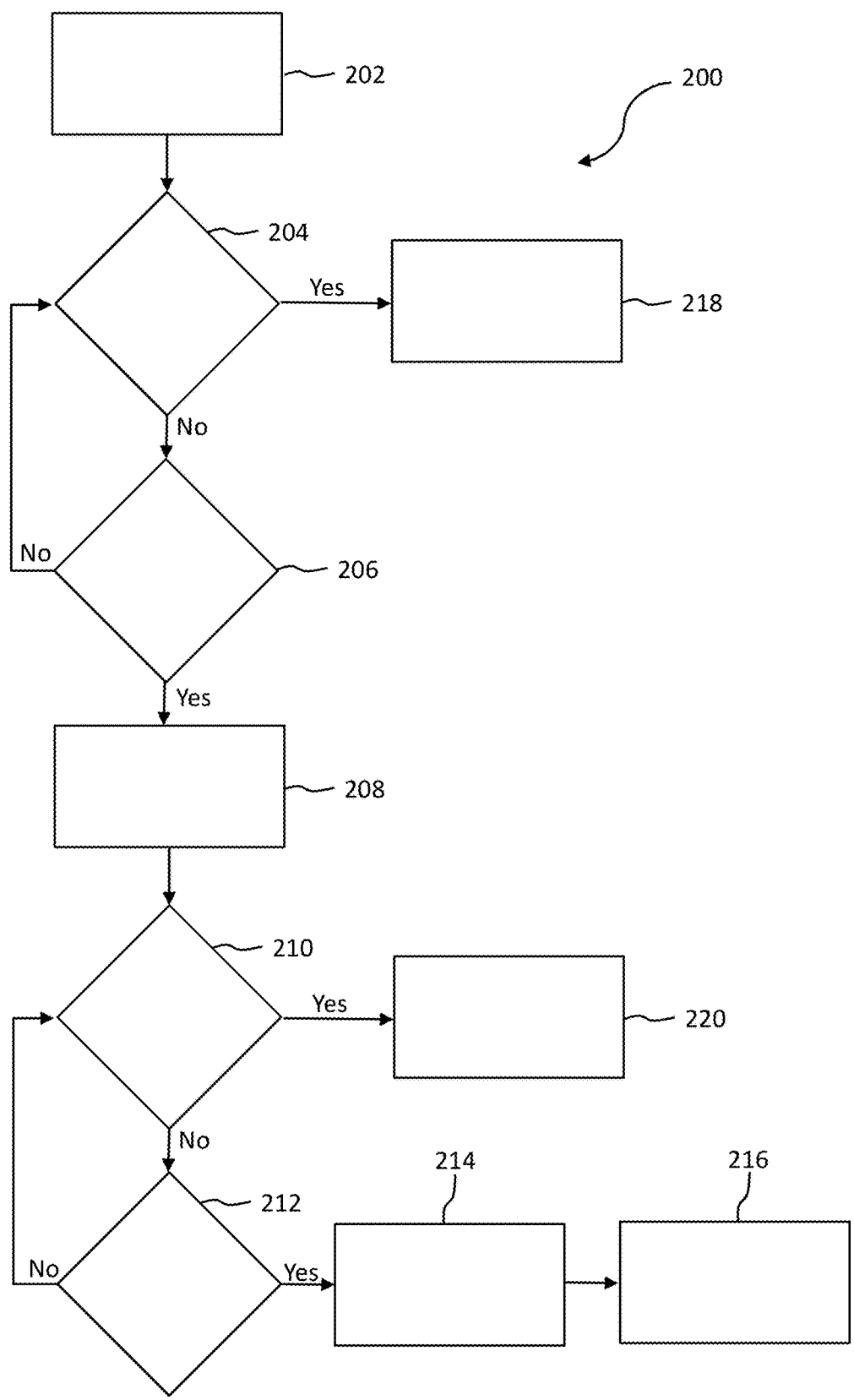
FIG. 16 is a flowchart diagram of an exemplary embodiment of a method for displaying a status of an automated lane change maneuver.

FIG. 16 shows an exemplary embodiment of a method 200 for displaying a status of the automated lane change maneuver. In block 202, a first indicator is displayed indicating acknowledgement of the first predetermined gesture. In block 204, it is determined whether a lane opening is detected. The lane opening may be detected using RADAR or LIDAR detectors. If a lane opening is not detected ("No" in block 204), the process proceeds to block 206. If a lane opening is detected ("Yes" in block 204), the process proceeds to block 218. In block 218, the process proceeds to block 110 in FIG. 15. In block 206, it is determined whether a first predetermined time period has elapsed. If the first predetermined time period has not elapsed ("No" in block 206), the process returns to block 204. If the first predetermined period has elapsed ("Yes" in block 206, the process proceeds to block 208. In block 208, a second indicator is displayed, the second indicator indicating that the first predetermined period has passed without detecting a lane opening. In block 210, it is determined whether a lane opening is detected. If a lane opening is not detected ("No" in block 210), the process proceeds to block 212. If a lane opening is detected ("Yes" in block 210), the process proceeds to block 220. In block 220, the process proceeds to block 110 in FIG. 15. In block 212, it is determined whether a second predetermined time period has elapsed. If the second predetermined time period has not elapsed ("No" in block 212), the process returns to block 210. If the second predetermined time period has elapsed ("Yes" in block 212), the process proceeds to block 214. In block 214, a third indicator is displayed, the third indicator indicating that the second predetermined time period has passed without detecting a lane opening. In block 216, the automated lane change maneuver is cancelled.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for initiating and executing an automated lane change maneuver in a vehicle operated by a user and having a steering wheel, the system comprising:
    an interface comprising a display, the interface being provided in the steering wheel; and
    a monitor structured to detect a viewing direction of the user, wherein the interface and the monitor are operably connected, and the interface is structured to:
        detect a first predetermined gesture by the user;
        in response to the first predetermined gesture by the user, transmit a first signal to the vehicle instructing the vehicle to prepare for the automated lane change maneuver;
        display, on the display, a status of the automated lane change maneuver;
        display, on the display, a prompt for the user to visually confirm safety of the automated lane change maneuver; and
    the monitor is structured to:
        in response to the prompt for the user to visually confirm safety of the automated lane change maneuver; detect the viewing direction of the user; and
        in response to the viewing direction of the user changing to visually confirm safety of the automated lane change maneuver, transmit a second signal to the vehicle instructing the vehicle to execute the automated lane change maneuver.

2. The system of claim 1, wherein the interface comprises a touchless motion detector structured to detect the first predetermined gesture by the user.

3. The system of claim 1, wherein the interface comprises a touch screen detector and the first predetermined gesture comprises a predetermined movement of a finger or hand of the user on the touch screen detector.

4. The system of claim 1, wherein the display is configured to display a first indicator indicating acknowledgment of the first predetermined gesture.

5. The system of claim 4, wherein the display is configured to display, after a first predetermined time period, a second indicator to indicate a passage of the first predetermined time period.

6. The system of claim 5, wherein the display is configured to display, after a second predetermined time period, a third indicator to indicate a time out and cancellation of the automated lane change maneuver.

7. The system of claim 1, wherein the prompt comprises a dynamic graphic.

8. The system of claim 1, wherein the interface is structured to, in response to a second predetermined gesture by the user, transmit a third signal to the vehicle instructing the vehicle to cancel the automated lane change maneuver.

9. A method for initiating and executing an automated lane change maneuver in a vehicle operated by a user and having a steering wheel, the method comprising:
providing an interface comprising a display in the steering wheel, and a monitor structured to detect a viewing direction of the user;
detecting, with the interface, a first predetermined gesture by the user;
in response to the detection of the first predetermined gesture, transmitting a first signal to the vehicle instructing the vehicle to prepare for the automated lane change maneuver;
displaying, on the display, a status of the automated lane change maneuver;
displaying, on the display, a prompt for the user to visually confirm safety of the automated lane change maneuver;
in response to the prompt for the user to visually confirm safety of the automated lane change maneuver; detecting, with the monitor, the viewing direction of the user; and
in response to the viewing direction of the user changing to visually confirm safety of the automated lane change maneuver, transmitting a second signal to the vehicle instructing the vehicle to execute the automated lane change maneuver.

10. The method of claim 9, wherein the displaying a status of the automated lane change maneuver comprises displaying a first indicator indicating acknowledgement of the first predetermined gesture.

11. The method of claim 10, wherein the displaying a status of the automated lane change maneuver further comprises displaying, after a first predetermined time period, a second indicator to indicate a passage of the first predetermined time period.

12. The method of claim 11, wherein the displaying a status of the automated lane change maneuver further comprises displaying, after a second predetermined time period, a third indicator to indicate a time out and cancellation of the automated lane change maneuver.

13. The method of claim 9, wherein the displaying a prompt comprises displaying a dynamic graphic.

14. The method of claim 9, further comprising:
in response to a second predetermined gesture by the user, transmitting a third signal to the vehicle instructing the vehicle to cancel the automated lane change maneuver.

15. The system of claim 6, wherein the first indicator has a first color, the second indicator has a second color, and the third indicator has a third color; and
the first color, the second color, and the third color are different from each other.

16. The system of claim 6, wherein the first indicator blinks at a first frequency, the second indicator blinks at a second frequency, and the third indicator blinks at a third frequency.

17. The system of claim 16, wherein the second frequency is higher than the first frequency, and the third frequency is higher than the second frequency.

18. The system of claim 17, wherein the dynamic graphic comprises an indicator that moves in a direction of the automated lane change maneuver.

19. The method of claim 12, wherein the first indicator has a first color, the second indicator has a second color, and the third indicator has a third color;
the first color, the second color, and the third color are different from each other;
the first indicator blinks at a first frequency, the second indicator blinks at a second frequency, and the third indicator blinks at a third frequency; and
the second frequency is higher than the first frequency, and the third frequency is higher than the second frequency.

20. The method of claim 13, wherein the dynamic graphic comprises an indicator that moves in a direction of the automated lane change maneuver.

* * * * *